July 9, 1946.  A. M. STONER  2,403,768
DOUBLE ACTING COLLET CHUCK
Filed Aug. 31, 1944   3 Sheets-Sheet 1
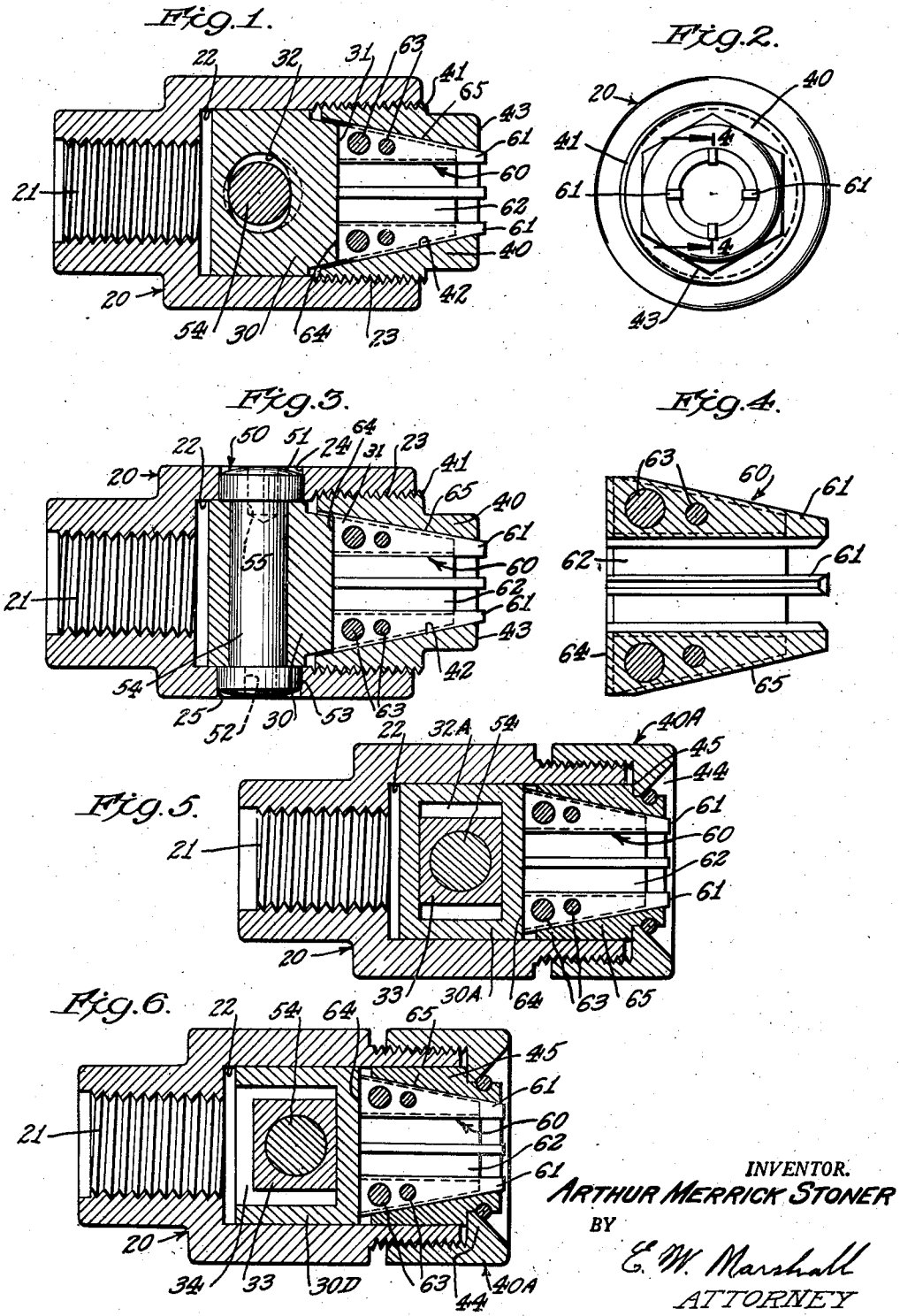
INVENTOR.
ARTHUR MERRICK STONER
BY
E. W. Marshall
ATTORNEY

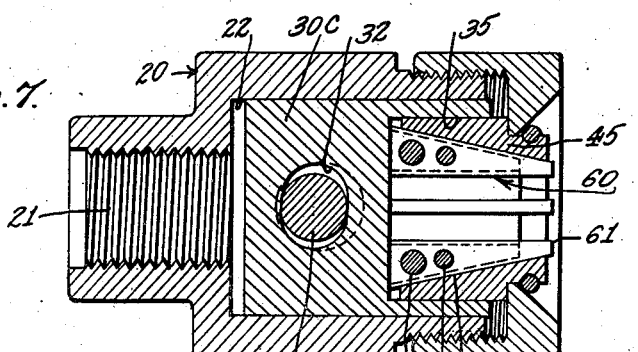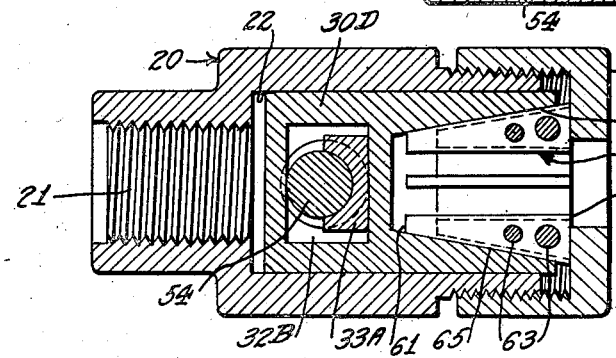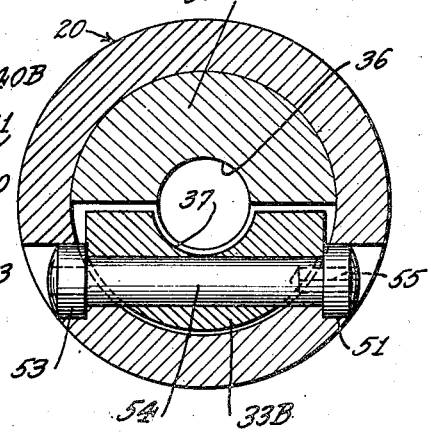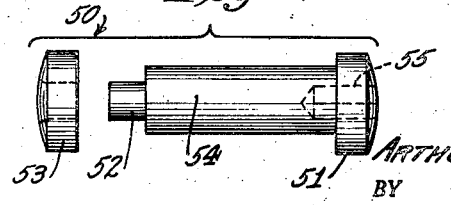

July 9, 1946.  A. M. STONER  2,403,768
DOUBLE ACTING COLLET CHUCK
Filed Aug. 31, 1944  3 Sheets-Sheet 3

INVENTOR.
ARTHUR MERRICK STONER
BY
E. W. Marshall
ATTORNEY

Patented July 9, 1946

2,403,768

UNITED STATES PATENT OFFICE 2,403,768

DOUBLE-ACTING COLLET CHUCK

Arthur Merrick Stoner, West Hartford, Conn., assignor to The Jacobs Manufacturing Company, Hartford, Conn., a corporation of Connecticut Application August 31, 1944, Serial No. 552,065

8 Claims. (Cl. 279—51)

1

This invention relates to a Double acting collet chuck. Its object is to provide a simple and inexpensive construction in which a collet having a tapered portion is engaged between two parts of a chuck which are relatively movable longitudinally, one of which members is constructed with a cone-shaped cam surface which engages the tapered portion of the collet and the other of which has a transverse abutment surface which engages an end of the collet. It relates more particularly to that type of chuck which has a hollow body provided with means for attachment to a machine tool with a longitudinally slidable member or thrust block within it actuated by an eccentric transverse pin and a collar in threaded engagement with the body whereby the collar is first rotated to move it toward the block to compress the collet into initial contact with an article within it, after which the block is moved toward the collar to effect a final grip on the article.

This application is a continuation in part of application Serial No. 527,384, filed by me March 21, 1944.

I have illustrated several constructions for effecting the foregoing results which I will describe in the following specification and will point out the novel features of the invention in the appended claims.

Referring to the drawings:

Figure 1 is a sectional side elevation of a chuck which is made according to and embodies this invention;

Fig. 2 is a front view of the chuck shown in Fig. 1;

Fig. 3 is a sectional side elevation of the chuck shown in Fig. 1, the view being taken at right angles to that shown in the latter figure;

Fig. 4 is a sectional side elevation on a larger scale of the collet shown in the preceding and other figures; the section is taken on the line 4—4 of Fig. 2;

Fig. 5 is a sectional side elevation of a chuck of modified construction which also embodies this invention;

Fig. 6 is a similar section of a chuck similar to that shown in Fig. 5, but of modified form;

Fig. 7 is a sectional side elevation showing another structural modification;

Fig. 8 shows a further modification;

In Figs. 9 and 10, I have shown in sectional side elevation and sectional transverse elevation respectively, another form of chuck which embodies my invention;

Fig. 11 is an elevation of a detail of construction showing a transverse pin and bushing separated from each other. This pin is a part of the structures shown in the preceding figures.

Figure 12:
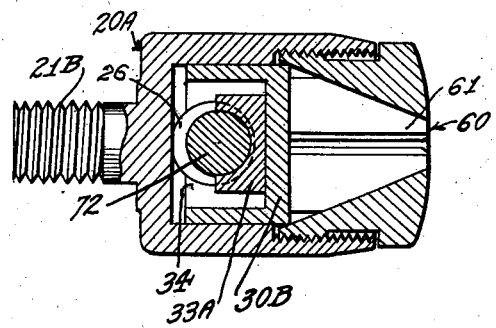

Another structural modification is illustrated in sectional side elevation in Fig. 12.

Figure 13:
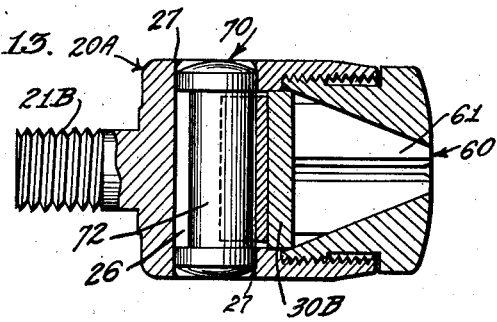

Fig. 13 is a sectional plan view of the chuck shown in Fig. 12.

Figure 14:
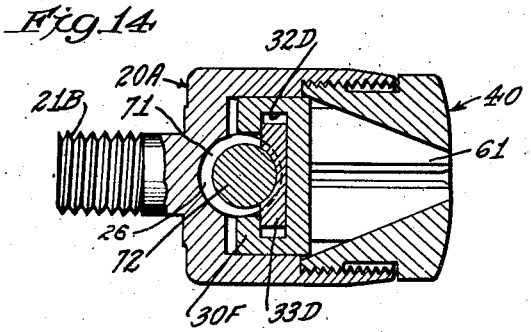

Fig. 14 is a sectional side elevation of a chuck of still further modification.

Figure 15:
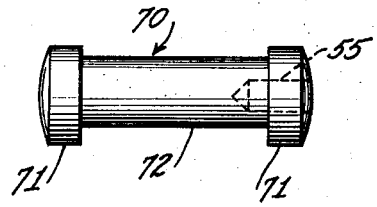

Fig. 15 is an elevation of the transverse pin used as a part of the chucks shown in Figs. 12–14.

Referring first to Figs. 1, 2 and 3, 20 designates the body of the chuck. This is a hollow cylindrical member provided with threads 21 at its rear end by means of which it can be attached to a machine tool, and a bore 22, the forward part of which is internally threaded as at 23.

30 is a thrust block slidably mounted in the bore 22. It has a transverse abutment surface 31 at its forward end back of which is a transverse slot 32 which has flat parallel sides and is somewhat longer than the distance between its sides.

40 is a collar, externally threaded at 41, to fit the threads 23 on the forward part of the body. It has an internal cone-shaped cam surface 42 and its outer end 43 may be formed with flattened sides to facilitate its rotation.

50 is a pin which passes transversely through the body 20 and the block 30. This pin has an enlarged circular head 51 which is rotatively seated in a circular pocket 24 in one side of the body. The opposite end portion 52 of the pin is of restricted diameter and fits a circular bushing 53, the outer diameter of which is shown to be the same as that of the head 51 and is arranged to be rotatively seated in a circular pocket 25 in the other side of the body. The head 51, bushing 53 and the openings 24 and 25 are all in axial alinement. The intermediate part 54 of the pin between the head 51 and the bushing 53 is circular in cross section with its axis offset from the axis of the head and the bushing. Its diameter is less than that of the head and the bushing and greater than that of the reduced portion 52. This intermediate part 54 of the pin passes through the slot 32 in the block, the sides of which are spaced apart a distance to provide a sliding fit with this part of the pin. A polygonally sided hole 55 is provided in one end of the pin for the reception of a wrench by which the pin may be rotated.

These parts are assembled by passing the pin through one side of the body, through the slot 32 in the block and into the pocket 25 in the body.

The bushing 53 is then placed on the restricted end 52 of the pin into its seat 25 in the body after which the end of the restricted part 52 is riveted over the adjacent part of the bushing.

A collet 60 is interposed between the block 30 and the collar 40. This comprises a plurality of wedge shaped gripping members 61 of rigid material angularly and radially disposed about a common axis. These are interconnected by a body 62 of resilient material which may pass through perforations in the gripping members, as at 63. Such a collet is more particularly described in my Patents Nos. 2,346,706 and 2,346,707 issued April 18, 1944, and in a copending application for patent Serial No. 521,907, filed by me Feb. 4, 1944. Its gripping members form a transverse end 64 and their outer edges 65 are adapted to be engaged by the cam surface 42 of the collar.

In Fig. 5 the transverse slot or pocket 32A in the thrust block 30A is wider than that shown in the previously described figures and a cross-head 33 having a bore which fits the part 54 of the transverse pin is slidably fitted in the slot 32A. In this figure the forward part of the body is externally threaded and the collar 40A provided with internal threads to fit it.

The collar 40A has an inwardly extending flange 44 with a flat inner face which bears on a shoulder formed on a pressure member 45 which has an outer cylindrical surface fitting the bore 22 and an inner conical cam surface adapted to engage the tapered edges 65 of the gripping members of the collet. A description of a way of interconnecting the collar and the pressure member shown in Fig. 5 may be found in my copending application for patent Serial No. 510,447, filed Nov. 16, 1943.

Fig. 6 is similar to Fig. 5, but in this case the rear end of the thrust block 30D is open at as 34.

In Fig. 7 the pressure member 45 fits a cylindrical bore 35 formed in an extension of the thrust block 30C.

In Fig. 8 the cone-shaped cam surface 42A is formed in an extension of the thrust block 30D and the flat inner surface of the collar flange 44A bears against the end 64 of the collet, the position of which in this figure is the reverse of that shown in the other figures.

A modification of the cross-head 33A is shown in this figure in which it bears against one side only of the transverse groove or pocket 32B. A groove is formed across the other side of the cross-head and the intermediate part 54 of the transverse pin fits between this groove and the opposite flat side of the groove 32B.

In Figs. 9 and 10 a longitudinal central bore 36 passes through the block 30E. The transverse slot 32C is cut across one side of the block. 33B is a cross-head in the slot 32E in the block 30E fitting its sides and slidable radially therein. The cross-head is cut away as at 37 (Fig. 10) to clear the bore 36. It has a transverse bore in which fits the intermediate part 54 of the transverse pin.

In this construction the chuck is open from end to end. The threads 21A are shown on the outside of the rear end of the body 20 and the nut 40B has an outwardly extending flange 44B.

The pin 50 which has been described and which is illustrated in detail in Fig. 11 is used in all of the constructions which have been described.

In the construction shown in Figs. 12 and 13, the thrust block 30B is like that shown in Fig. 6, open at its rear end, as at 34, and the cross-head 33A is similar to that shown in Fig. 8. In this case and in Fig. 14 the body 20A has a solid threaded shank 21B projecting from its rear end. A solid transverse pin 70 like that shown in Fig. 15 is used with these constructions. This form has concentric circular heads 71, 71 and an intermediate eccentric portion 72. The latter is of reduced diameter so that shoulders are formed between it and the heads 71. A transverse bore 26 of a diameter corresponding to that of the heads 71 is made through the body 20A and the pin 70 is inserted therein. Then the thrust block 30B and the cross-head 33A are inserted in the body from its front end before the collet 60 is inserted and the collar 40 is applied. The width of the cross-head is substantially the same as the distance between the shoulders formed on the pin. It fits between the shoulders and restrains the pin from longitudinal movement. If desired, portions of the body may be peened, as at 27, to further restrain the pin.

The modification illustrated in Fig. 14 is similar to that shown in Figs. 12 and 13, but in this case the cross-head 33D is thinner and fits slidingly in a transverse groove 32D formed in the thrust block 30F.

In all of the structures shown, initial compression of the collet is effected by screwing the nut or collar into or onto the body. This will hold an article within the collet in desired centralized position. Further and final grip on the article is obtained by rotating the transverse pin to force the thrust block and the collet toward the nut or collar. In the constructions shown in Figs. 1–3, 5, 7–10 the thrust block is retracted by turning the pin in the opposite direction. In the other forms the resilience of the material 62 will release the gripping members when the longitudinal pressure is removed from them.

Various modifications in construction, mode of operation, method and use of an invention may and do occur to others, especially after benefitting from knowledge of such a disclosure as that herein presented of the principles involved, but the invention itself is not confined to the present showing.

I claim:

1. A chuck comprising a hollow body, means for attaching the body to a machine tool, a thrust block longitudinally slidable in the body having a transverse slot therein and a transverse abutment surface formed on its forward end, a collet comprising a plurality of angularly spaced wedge-shaped gripping members of rigid material with their wider ends in slidable engagement with said abutment surface and a body of resilient material interconnecting said gripping members and holding said members in substantially radial positions, a member in adjustable threaded engagement with the forward part of the body, a cone-shaped cam actuated by said threaded member arranged to engage the outer edges of the gripping members to move their inner ends across the abutment surface of the thrust block, and a pin passing through the thrust block having an enlarged end portion seated in a circular opening in the body and rotatable therein, said end portion of the pin being eccentric to the part thereof which is in the thrust block.

2. A chuck comprising a hollow body, means for attaching the body to a machine tool, a thrust block longitudinally slidable in the body having a transverse slot therein and a transverse abutment surface formed on its forward end, a collet comprising a plurality of angularly spaced wedge-shaped gripping members of rigid material with their wider ends in slidable engagement with said abutment surface and a body of resilient material interconnecting said gripping members and holding said members in substantially radial positions, a member in adjustable threaded engagement with the forward part of the body, a cone-shaped cam in said threaded member arranged to engage the outer edges of the gripping members to move their inner ends across the abutment surface of the thrust block, and a pin passing through the body having enlarged end portions seated in circular openings in the body and rotatable therein, and an intermediate eccentric portion passing through the slot in the thrust block.

3. A chuck comprising a hollow body, means for attaching the body to a machine tool, a thrust block longitudinally slidable in the body, said block having a transverse slot with parallel flat sides and having a transverse abutment surface formed on its forward end, a cross-head in said slot, a transverse bore through the cross-head, a member in adjustable threaded engagement with the forward part of the body, said threaded member having a cone-shaped cam, a collet interposed between the block and the threaded member, said collet comprising a plurality of wedge-shaped gripping members with their wider ends seated on said abutment surfaces arranged to engage the outer edges of the gripping members, and a pin passing transversely through the body and the block having end portions seated in circular openings in the body and rotatable therein and an intermediate eccentric portion fitting the transverse bore therethrough.

4. A chuck comprising a hollow body, means for attaching the body to a machine tool, a thrust block longitudinally slidable in the body, said block having a longitudinal bore passing therethrough, a transverse slot extending laterally from one side of the bore with parallel flat sides normal to the axis of the bore, and having a transverse abutment surface formed on its forward end, a cross-head in said slot, a transverse bore through the cross-head, a member in adjustable threaded engagement with the forward part of the body, said threaded member having a cone-shaped cam, a collet interposed between the block and the threaded member, said collet comprising a plurality of wedge-shaped gripping members with their wider ends seated on said abutment surface, arranged to engage the outer edges of the gripping members, and a pin passing transversely through the body and the cross-head offset from the axis of the body and the block to clear the longitudinal bore in the block, said pin having end portions seated in circular openings in the body and rotatable therein, and an intermediate eccentric portion fitting the transverse bore through the cross-head.

5. A chuck comprising a hollow body, means for attaching the body to a machine tool, a thrust block longitudinally slidable in the body, said block having a longitudinal bore passing therethrough, a transverse slot extending laterally from one side of the bore with parallel flat sides, normal to the axis of the bore, and a transverse abutment surface formed in its forward end, a cross-head in said slot, a transverse bore through the cross-head, a threaded member in engagement with the forward part of the body, a collet interposed between the block and the threaded member, said collet comprising a plurality of wedge-shaped gripping members with their ends arranged to be engaged by said abutment surface, said threaded member having a cone-shaped cam arranged to engage the outer edges of the gripping members, and a pin passing transversely through the body and the cross-head, having enlarged circular heads seated in pockets in the body and rotatable therein, and an intermediate eccentric cylindrical portion of reduced diameter in the bore through the cross-head.

6. A chuck comprising a hollow body, means for attaching the body to a machine tool, a thrust block longitudinally slidable in the body, said block having a transverse slot having parallel flat sides and a transverse abutment surface formed in its forward end, a cross-head in said slot, a threaded member in engagement with the forward part of the body, a collet interposed between the block and the threaded member, said collet comprising a plurality of wedge-shaped gripping members with their ends arranged to be engaged by said abutment surface, said threaded member having a cone-shaped cam arranged to engage the outer edges of the gripping members, and a pin passing transversely through the body back of the cross-head, having end portions seated in circular openings in the body and rotatable therein, and an intermediate eccentric cylindrical portion engaging the cross head and one side of the slot.

7. A chuck comprising a hollow body, means for attaching the body to a machine tool, a hollow thrust block longitudinally slidable in the body, said block having transverse abutment surfaces formed at its forward end, a cross-head engaging one of the abutment surfaces, a threaded member in engagement with the forward part of the body, a collet interposed between the block and the threaded member, said collet comprising a plurality of wedge-shaped gripping members with their ends arranged to be engaged by the other abutment surface, said threaded member having a cone-shaped cam arranged to engage the outer edges of the gripping members, and a pin passing transversely through the body back of the cross-head having enlarged circular heads seated in pockets in the body and rotatable therein, and an intermediate eccentric cylindrical portion of reduced diameter engaging the cross-head, the heads of the transverse pin overlapping the cross-head.

8. A chuck comprising a hollow body, means for attaching the body to a machine tool, a hollow thrust block longitudinally slidable in the body, said block having transverse abutment surfaces formed at its forward end, a cross-head engaging one of the abutment surfaces, a transverse groove across the cross-head, a threaded member in engagement with the forward part of the body, a collet interposed between the block and the threaded member, said collet comprising a plurality of wedge-shaped gripping members and an interconnecting body of resilient material with the ends of the gripping members arranged to be engaged by the other abutment surface, said threaded member having a cone-shaped cam arranged to engage the outer edges of the gripping members, a transverse bore through the body back of the cross-head, and a pin in said bore having enlarged circular heads rotatable therein, and an intermediate eccentric cylindrical portion of reduced diameter engaging the cross-head, the heads of the transverse pin overlapping the cross-head.

ARTHUR MERRICK STONER.